US007066611B2

(12) United States Patent
Anderson

(10) Patent No.: US 7,066,611 B2
(45) Date of Patent: Jun. 27, 2006

(54) ALIGNMENT WITH LINEAR ARRAY OF RECEPTORS

(75) Inventor: Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 10/717,952

(22) Filed: Nov. 19, 2003

(65) Prior Publication Data

US 2005/0104965 A1 May 19, 2005

(51) Int. Cl.
*G03B 21/00* (2006.01)
*G02F 12/06* (2006.01)
*G01B 11/26* (2006.01)
*H04N 3/26* (2006.01)

(52) U.S. Cl. .................. 353/121; 353/122; 356/138; 356/606; 356/622; 345/571; 348/745

(58) Field of Classification Search ............... 353/122, 353/121; 356/153, 154, 138, 606, 622, 391, 356/909; 345/564–574, 28; 348/748
See application file for complete search history.

(56) References Cited

U.S. PATENT DOCUMENTS 4,252,439 A * 2/1981 Drozella ..................... 356/153
2004/0091719 A1* 5/2004 Uchida ........................ 428/429

* cited by examiner

*Primary Examiner*—W. B. Perkey
*Assistant Examiner*—Rochelle Blackman

(57) ABSTRACT

A beam projector is aligned with a linear array of receptors. An alignment receptor is at each end of the linear array of receptors. A beam is projected from the projector. The beam is swept until the alignment receptors sense the beam. A signal is transmitted upon each of the alignment receptors sensing the beam. The position of the beam projector is recorded in response to the transmitted signals. The alignment position of the beam projector, to align with the linear array of receptors, is computed from the recorded positions. The beam projector is aligned with the linear array of receptors according to the alignment position.

19 Claims, 4 Drawing Sheets

ALIGNMENT WITH LINEAR ARRAY OF RECEPTORS

FIELD OF THE INVENTION

This invention relates in general to projection alignment and, more particularly, to alignment of a projector with a linear array of receptors.

BACKGROUND OF THE INVENTION

It is, at times desirable to optically transmit data to a linear array of receptors using a projected beam. In order to properly address each receptor, it may be necessary to ensure that each receptor is aligned with the projected beam during communication of the data. In such cases, alignment of the beam with the array is critical to the successful transmission of data to all of the receptors in the array.

Without proper alignment, data may wholly or partially transmitted to an undesired receptor in the array or lost altogether. Either error is likely to result in an undesirable outcome.

SUMMARY OF THE INVENTION

According to principles of the present invention, in one embodiment, a beam projector is aligned with a linear array of receptors. An alignment receptor is at each end of the linear array of receptors. A beam is projected from the projector. The beam is swept until the alignment receptors sense the beam. A signal is transmitted upon each of the alignment receptors sensing the beam. The position of the beam projector is recorded in response to the transmitted signals. The alignment position of the beam projector, to align with the linear array of receptors, is computed from the recorded positions. The beam projector is aligned with the linear array of receptors according to the alignment position.

DETAILED DESCRIPTION OF THE INVENTION

Figure 1:
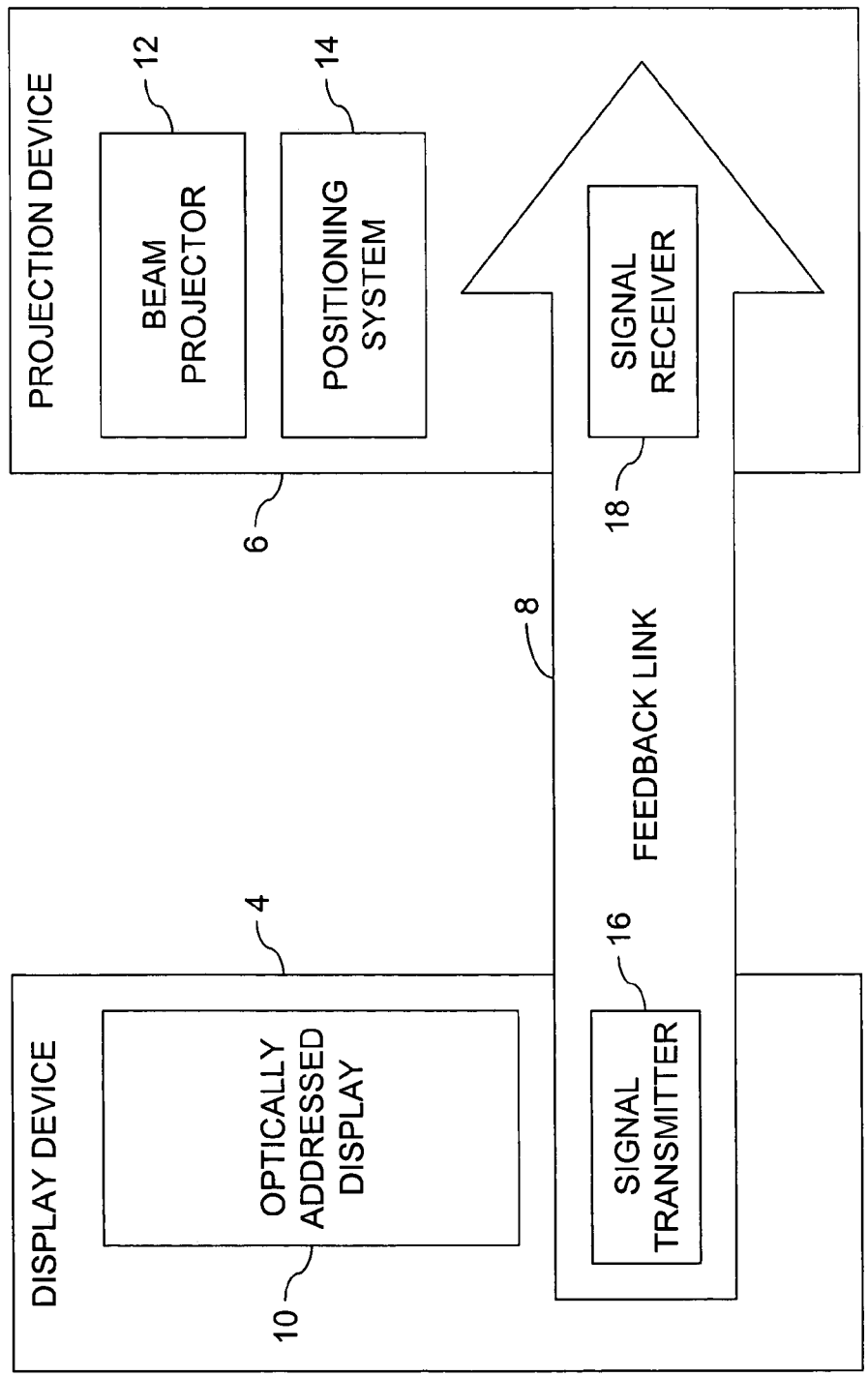
FIG. 1 is a block diagram of one embodiment of the present invention display system.

Illustrated in FIG. 1 is a block diagram of one embodiment of a display system 2 of the present invention. In one embodiment, display system 2 includes display device 4, projection device 6, and feedback link 8. Display device 4 includes optically addressed display 10 and a portion of feedback link 8. Projection device 6 includes beam projector 12, positioning system 14, and a portion of feedback link 8. Feedback link 8 includes signal transmitter 16 and signal receiver 18.

Figure 2:
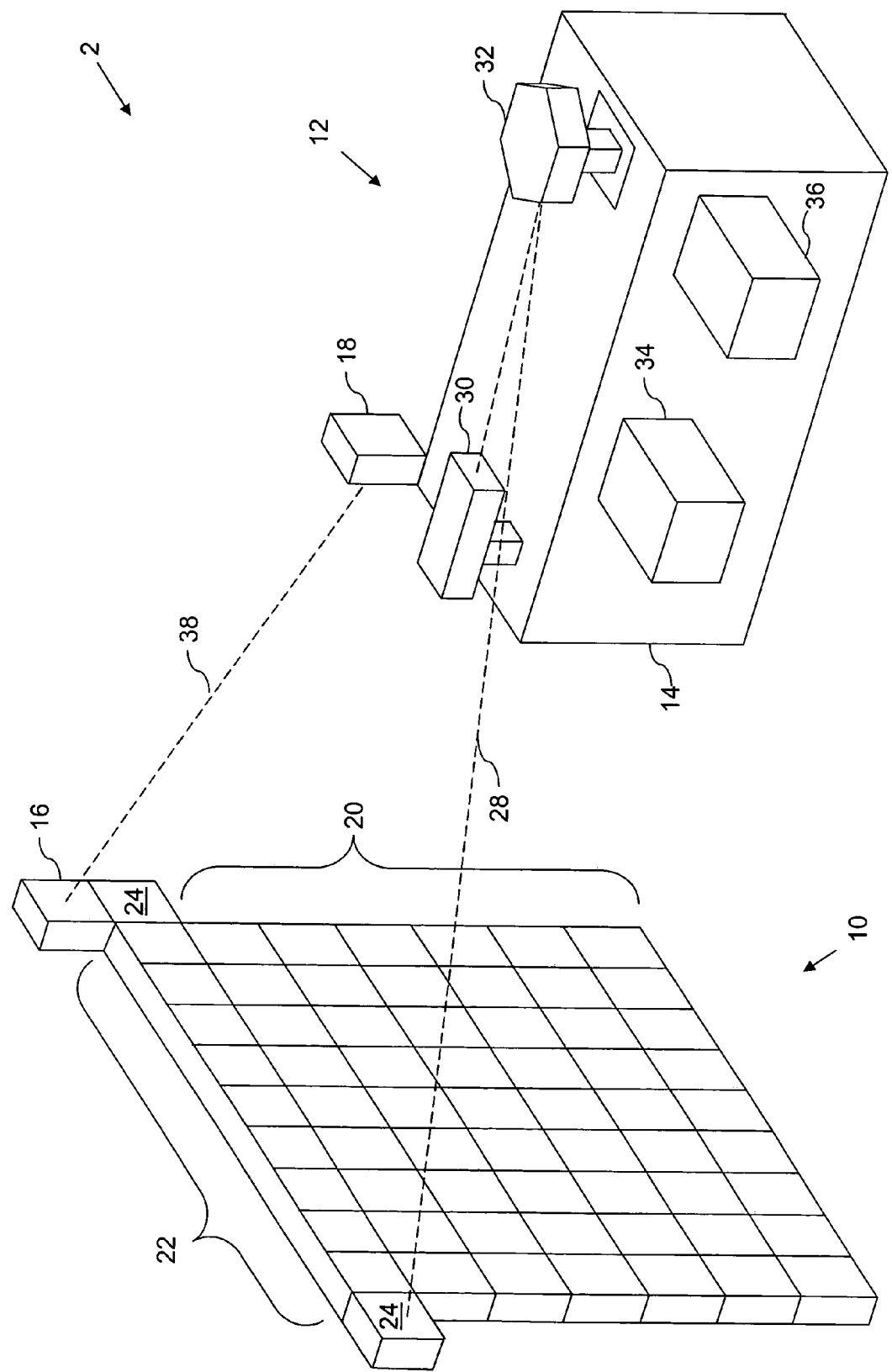
FIG. 2 is a more detailed depiction of the display system shown in FIG. 1.

Illustrated in FIG. 2 is a more detailed representation of one embodiment of display system 2. In this embodiment, display system 2 includes feedback link 8 (FIG. 1), optically addressed display 10, beam projector 12, and positioning system 14.

Optically addressed display 10 is any combination of hardware and executable code configured to display an image in response to transmitted instructions. Optically addressed displays are described in U.S. patent application Ser. No. 10/020112 entitled "METHOD AND APPARATUS FOR IMAGE AND VIDEO DISPLAY" filed Dec. 14, 2001 and commonly assigned to the same assignee as the instant application and is herein incorporated by reference.

Optically addressed display 10 has an array of pixel cells 20 and a linear array of receptors 22 with a pair of alignment receptors 24 aligned with the linear array of receptors 22. In one embodiment, the alignment receptors 24 are disposed one at each end of the linear array of receptors 22.

At least one of the receptors 22 in the array communicates with the array of pixel cells 20 to active of pixel cells 20. In one embodiment, each receptor 22 in the linear array communicates with a column of pixel cells 20 to separately activate each of the pixel cells 20 in the column.

Figure 3:
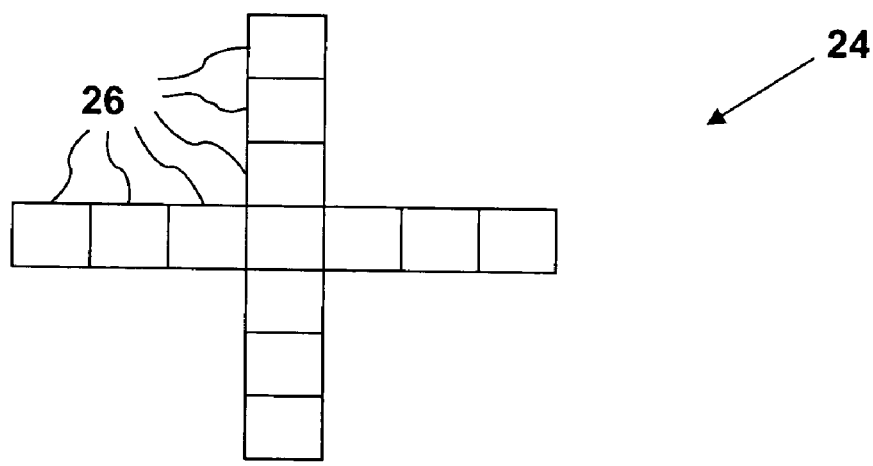
FIG. 3 represents an alternate embodiment of the alignment receptors in FIG. 2.
Figure 4:
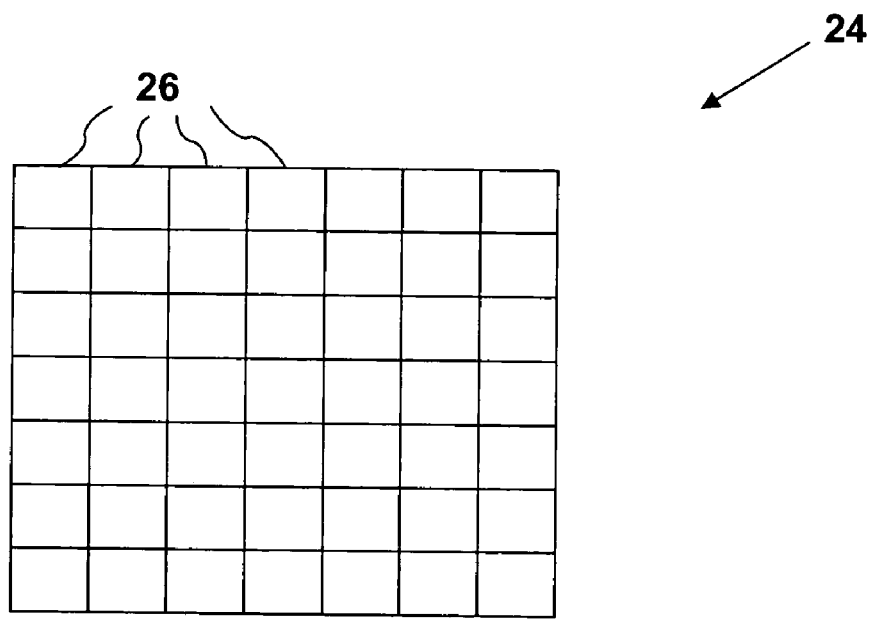
FIG. 4 represents an alternate embodiment of the alignment receptors in FIG. 2.

In one embodiment, each alignment receptor 24 includes a single optical sensor. In an alternate embodiment, each alignment receptor 24 includes a plurality of optical sensors 26. FIGS. 3 and 4 illustrate embodiments for of alignment receptors 24 where each alignment receptor 24 includes a plurality of optical sensors 26. FIG. 3 shows optical sensors 26 arranged into two intersecting lines. FIG. 4 shows optical sensors 26 arranged into a grid. In one embodiment, the spacing of optical sensors 26 is significantly greater than twice the density of the receptors 22 in the linear array of receptors 22.

Beam projector 12 is any device or system configured to project a beam 28. Beam projector 12 is disposed to project a beam 28 towards the linear array of receptors 22. Beam 28 is any type of coherent electromagnetic beam. Examples of types of beam 28 include infrared and visible light laser beams.

In one embodiment, beam projector 12 includes beam emitter 30 and rotating mirror 32. Beam emitter 30 emits beam 28 onto rotating mirror 32. Beam 28 is reflected from rotating mirror 32 towards optically addressable display 10. As rotating mirror 32 rotates, beam 28 is swept or scanned across optically addressable display 10. In one embodiment, beam 28 is swept horizontally across optically addressable display 10 as rotating mirror 32 rotates. In alternative embodiments, beam 28 is swept in other linear directions across optically addressable display 10 as rotating mirror 32 rotates.

Feedback link 8 is any device or system configured to provide feedback from alignment receptors 24 to positioning system 14 in response to each alignment receptor 24 sensing beam 28 from beam projector 12. In one embodiment, feedback link 8 includes signal transmitter 16 and signal receiver 18. The signal transmitted and received by signal transmitter 16 and signal receiver 18, respectively, may be any kind of signal for transmitting information. Examples of types of signals include electrical, radio frequency, and optical signals. The signal may pass through any type of path 38 suited for the type of signal.

Signal transmitter 16 communicates with each alignment receptor 24 to transmit a signal in response to each alignment receptor 24 sensing a beam from beam projector 12. Signal transmitter 16 is mounted in any suitable location. In one embodiment, signal transmitter 16 is mounted to the side of optically addressed display 10.

Signal receiver 18 is disposed to receive a signal from signal transmitter 16. Signal receiver 18 communicates with positioning system 14 to inform positioning system 14 that a signal was received by signal receiver 18. Signal receiver 18 is mounted in any suitable location. In one embodiment, signal receiver 18 is mounted to the front of beam projector 12.

Positioning system 14 is any combination of hardware and executable code configured to control the position of beam projector 12. Positioning system 14 is mechanically coupled to beam projector 12 to control the position of beam projector 12 and align beam projector 12 in response to feedback from alignment receptors 24. Positioning system 14 may include one or more vertical positioners, horizontal positioners, and tilt angle positioners to control the horizontal, vertical and tilt angle, respectively, of bean projector 12. In one embodiment, the horizontal positioner includes a timing controller for rotating mirror 32.

One example of a vertical, horizontal, and tilt angle positioner is a stepper motor. The stepper motor is disposed to position the desired aspect of beam projector 12.

In one embodiment, positioning system 14 includes processing system 34 and program storage system 36. Processing system 34 is any combination of hardware and executable code configured to execute executable code stored in storage system 36.

Storage system 36 is any device or system configured to store data or executable code. Storage system 36 may also be a program storage system tangibly embodying a program, applet, or instructions executable by processing system 34 for performing the method steps of the present invention executable by processing system 34. Storage system 36 may be any type of storage media such as magnetic, optical, or electronic storage media. Storage system 36 is illustrated in FIG. 2 as a single device. Alternatively, storage system 36 may include more than one device. Furthermore, each device of storage system 36 may be embodied in a different media type. For example, one device of storage system 36 may be a magnetic storage media while another device of storage system 36 is an electronic storage media.

Although shown to be part of positioning system 14, either or both of processing system 34 and storage system 36 may alternatively be separate from, but accessible by, positioning system 14.

Figure 5:
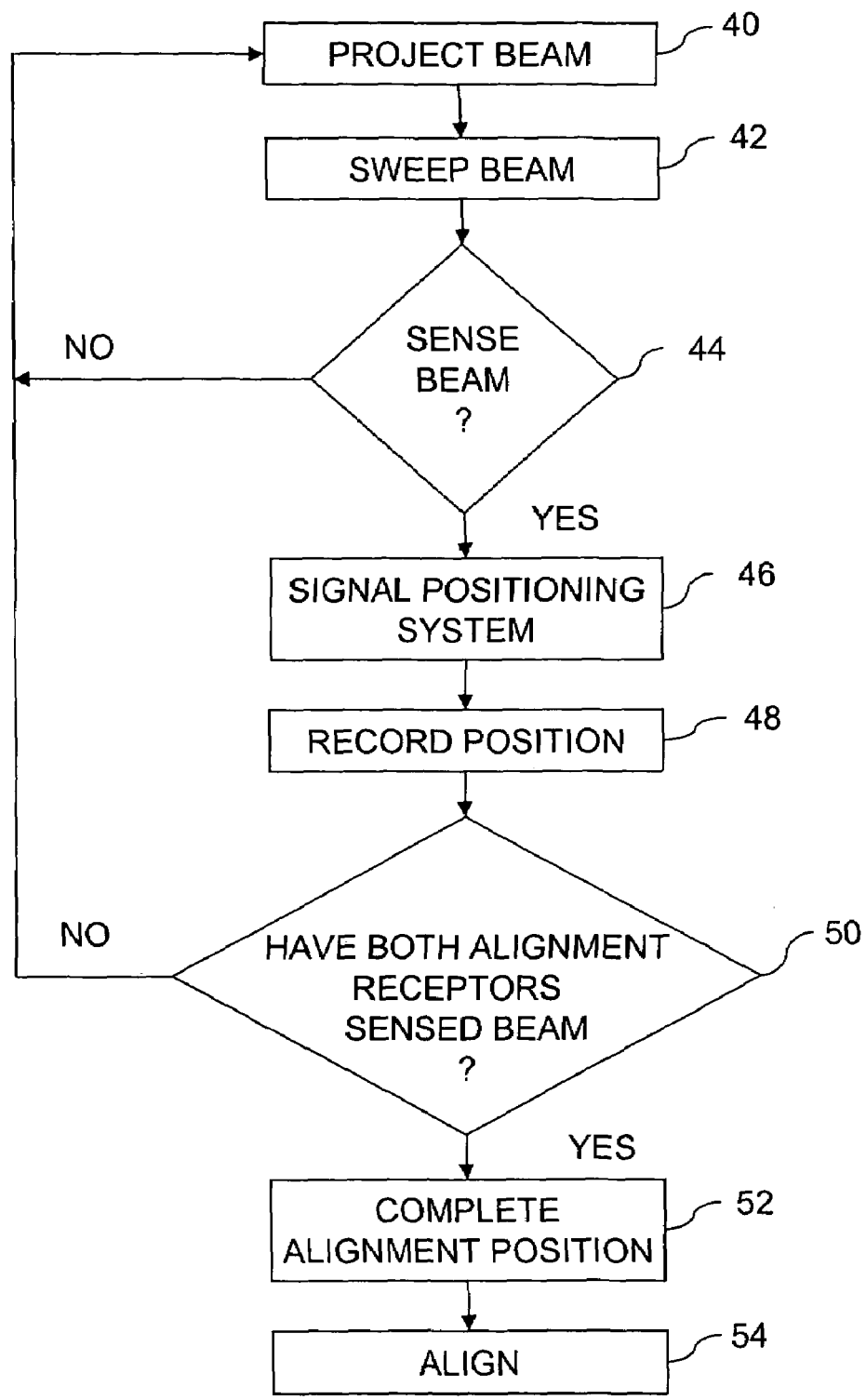
FIG. 5 is a flow chart illustrating one embodiment of the present invention method for method for using electromagnetic radiation to control exposure of media to electromagnetic radiation.

FIG. 5 is a flow chart representing steps of one embodiment of the present invention. Although the steps represented in FIG. 5 are presented in a specific order, the present invention encompasses variations in the order of steps. Furthermore, additional steps may be executed between the steps illustrated in FIG. 5 without departing from the scope of the present invention.

Beam 28 is projected 40 from beam projector 12. Beam 28 is swept 42 until the first and second alignment receptors 24 sense beam 28. In one embodiment, beam 28 is swept 42 is a methodical search pattern. One example of a methodical search pattern is sweeping 42 beam 28 horizontally across a distance, then vertically down a distance estimated to be less than the height of alignment receptors 24, then horizontally again.

In one embodiment, sweeping 42 in the vertical dimension is accomplished by a tilt of positioning system 14.

In one embodiment, the horizontal sweep is accomplished by the normal scanning function of rotating mirror 32. This scan is widened to maximize the chance of the encountering both alignment receptors 24. This width adjustment is accomplished though adjusting the timing of beam 28 as it relates to the rotation of rotating mirror 32.

When one of the alignment receptors 24 senses 44 beam 28, a signal is transmitted 46 through feedback link 8 to positioning system 14. In one embodiment, an electrical signal is transmitted 46. In another embodiment, an optical signal is transmitted 46.

The position of beam projector 12 is recorded 48 when the signal is received that one of the alignment receptors 24 has sensed 44 beam 28. Horizontal position, vertical position, and tilt angle are three examples of position information that may be recorded 48. In one embodiment, the position is recorded 48 in storage system 36.

Once both alignment receptors 24 have 50 sensed beam 28, an alignment position of beam projector 12 to align with the linear array of receptors 22 is computed 52 from the recorded positions. Horizontal position, vertical position, and tilt angle are three examples of position information that may be computed 52. In one embodiment, the alignment position is computed 52 by processing system 34.

Beam projector 12 is then aligned 54 with the linear array of receptors 22 according to the alignment position. In one embodiment, positioning system 14 aligns 54 beam projector 12 with the linear array of receptors 22.

This process is performed as often as desirable. In one embodiment, this process is performed periodically to test for proper alignment of beam projector 12 with linear array of receptors 22.

Where alignment receptors 24 include only one optical sensor 26, if alignment is lost, the alignment receptors must again be found to properly align beam projector 12 with linear array of receptors 22. Where alignment receptors 24 each include a plurality of sensors, as illustrated in FIGS. 3 and 4, the beginning of misalignment may be sensed as beam 28 moves off the center optical sensor 26 during a periodic alignment test. Real-time adjustments can be made to bring beam 28 back to the center optical sensor 26. This allows for alignment on the linear array of receptors 22 to not be lost as beam 28 moves occasionally off the center optical sensor 26.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for aligning a beam projector, comprising:
   projecting a beam from the projector;
   sweeping the beam across a first alignment receptor, a second alignment receptor and a linear array of receptors positioned between and adjacent the first alignment receptor and the second alignment receptor;
   sensing the beam using the first alignment sensor and the second alignment sensor;
   transmitting a first signal after the first alignment sensor senses the beam;
   transmitting a second signal after the second alignment sensor senses the beam
   responsive to the first signal and the second signal, recording the position of the beam projector;
   computing, from the recorded positions, an alignment position of the beam projector to align with the linear array of receptors; and
   aligning the beam projector with the linear array of receptors according to the alignment position.

2. The method of claim 1 wherein sweeping the beam includes sweeping the beam horizontally and vertically.

3. The method of claim 1 wherein transmitting a signal includes transmitting an electrical signal.

4. The method of claim 1 wherein the first signal and the second signal includes optical signals.

5. The method of claim 1 wherein recording the position of the beam projector include recording the horizontal position of the beam projector.

6. The method of claim 1 wherein recording the position of the beam projector include recording the vertical position of the beam projector.

7. The method of claim 1 wherein computing the alignment position of the beam projector includes computing the horizontal position of the beam projector.

8. The method of claim 7 wherein aligning the beam projector includes positioning the beam projector to the horizontal position of the alignment position.

9. The method of claim 1 wherein computing the alignment position of the beam projector includes computing the vertical position of the beam projector.

10. The method of claim 9 wherein aligning the beam projector includes positioning the beam projector to the vertical position of the alignment position.

11. The method of claim 1 wherein computing the alignment position of the beam projector includes computing the position tilt angle of the beam projector.

12. The method of claim 11 wherein aligning the beam projector includes positioning the beam projector to the tilt angle of the alignment position.

13. A program storage system readable by a computer, tangibly embodying a program, applet, or instructions executable by the computer to perform a method comprising:

instructing the projector to project a beam;

instructing a positioning system to sweep the beam across a first alignment receptor, a second alignment receptor and a linear array of receptors positioned between and adjacent the first alignment receptor and the second alignment receptors;

sensing the beam using the first alignment sensor and the second alignment sensor;

receiving a first signal indicative of the first alignment receptors sensing the beam;

receiving a second signal indicative of the second alignment sensor sensing the beam;

responsive to the first signal and the second signal, recording the position of the beam projector;

computing, from the recorded positions, an alignment position of the beam projector to align with the linear array of receptors; and instructing the positioning system to align the beam projector according to the alignment position.

14. The program storage system of claim 13 wherein instructing a positioning system to sweep the beam includes instructing the positioning system to sweep the beam horizontally and vertically.

15. The program storage system of claim 13 wherein recording the position of the beam projector include recording the horizontal position of the beam projector.

16. The program storage system of claim 13 wherein recording the position of the beam projector include recording the vertical position of the beam projector.

17. The program storage system of claim 13 wherein computing the alignment position of the beam projector includes computing the horizontal position of the beam projector.

18. The program storage system of claim 13 wherein computing the alignment position of the beam projector includes computing the vertical position of the beam projector.

19. The program storage system of claim 13 wherein computing the alignment position of the beam projector includes computing the position tilt angle of the beam projector.

* * * * *